(12) United States Patent
Woodcock

(10) Patent No.: US 9,447,907 B1
(45) Date of Patent: Sep. 20, 2016

(54) ELECTRICAL CONDUIT FITTING INSTALLATION SYSTEM AND METHOD OF USE

(71) Applicant: Bruce Woodcock, South Newfane, VT (US)

(72) Inventor: Bruce Woodcock, South Newfane, VT (US)

( * ) Notice: Subject to any disclaimer, the term of this patent is extended or adjusted under 35 U.S.C. 154(b) by 30 days.

(21) Appl. No.: 14/544,405

(22) Filed: Jan. 2, 2015

(51) Int. Cl.
*F16L 49/06* (2006.01)
*H02G 3/04* (2006.01)
*H02G 1/00* (2006.01)

(52) U.S. Cl.
CPC ............... *F16L 49/06* (2013.01); *H02G 1/00* (2013.01); *H02G 3/0481* (2013.01)

(58) Field of Classification Search
USPC ................... 174/68.1, 481; 248/300
See application file for complete search history.

(56) References Cited

U.S. PATENT DOCUMENTS

| 3,406,987 | A |  | 10/1968 | Hunder et al. | |
| 4,840,194 | A | * | 6/1989 | Berry | H02G 3/06 138/109 |
| 5,007,666 | A |  | 4/1991 | Kyfes | |
| 5,443,096 | A |  | 8/1995 | King | |
| 6,305,719 | B1 |  | 10/2001 | Smith, Jr. et al. | |
| 8,376,411 | B2 | * | 2/2013 | Newby | F16L 55/172 174/50 |

* cited by examiner

*Primary Examiner* — Dhirubhai R Patel
(74) *Attorney, Agent, or Firm* — Clifford F. Rey

(57) ABSTRACT

An electrical conduit fitting installation system and method of use for replacement of conduit fittings in existing installations and for new building construction is disclosed. The present system includes a plurality of electrical conduit fittings and couplings which are manufactured in mating half-sections that can be assembled by use of fasteners, gaskets and associated hardware. The use of such replacement conduit bodies of the present system allows replacement of a damaged conduit body of conventional unitary construction using standard tools without the need for disconnection and withdrawal of wiring from the conduit required to replace a conventional conduit body. The present system includes conduit bodies, couplings and accessory conduit components which are available in various configurations and standard sizes used in the industry. The replacement conduit bodies of the present system are fabricated of materials such as engineered plastics, metals and explosion proof materials to provide an industry approved installation.

7 Claims, 9 Drawing Sheets

ELECTRICAL CONDUIT FITTING INSTALLATION SYSTEM AND METHOD OF USE

CROSS-REFERENCE TO RELATED APPLICATIONS

This application claims the benefit under 35 U.S.C. 119(e) of U.S. Provisional Patent Application No. 61/964,356 filed Jan. 2, 2014, entitled Electrical Conduit Fitting Installation System and Method of Use.

BACKGROUND OF INVENTION

1. Field of Invention

The present invention relates to electrical conduit and fittings and, more particularly, to a method and apparatus for the repair and replacement of damaged conduit fittings and also relates to installation of electrical conduit in new construction.

Conduit is generally installed by electricians at the site of electrical equipment installation. Its use, form and installation details are often specified by wiring regulations such as the U.S. National Electrical Code (NEC) or other local codes. The term conduit is commonly used by electricians to describe any system that contains electrical wiring or conductors.

Electrical conduit provides necessary protection to enclosed wiring from impact, moisture and chemical vapors. When installed with proper sealing fittings, a conduit will not permit the flow of flammable gases and vapors, which provides protection from fire and explosion hazard in areas handling volatile substances.

It is not uncommon for conduit and fittings installed on electrical equipment to be damaged during building construction or during remodeling by movement of building materials on the worksite, vehicular impacts or other accidental contact requiring repair and/or replacement of the conduit and fittings. Further, the exposure of conduit and fittings to inclement weather causes corrosion and degradation necessitating replacement of such fittings to avoid an unsafe condition.

In the conventional practice to repair or replace damaged conduit fittings, the electrical power must be turned off and existing wiring disconnected and pulled from the conduit to remove the damaged fitting. Thereafter, the conduit fitting is replaced and the wiring must be routed though the new conduit and/or fitting and reconnected often causing extensive disruption of electrical service until the repair is complete. This results in substantial down time of the affected residential and/or commercial equipment and expensive labor costs to complete the repairs.

Thus, there is a need for a method and apparatus for repair and replacement of damaged conduit fittings, which will reduce the time and expense involved in completing such repairs and restoring service.

2. Description of Related Prior Art

Prior art patents are available, which include information that may be helpful in understanding the advantages of the present invention, and should be considered by the Patent Office with respect to this application.

U.S. Pat. No. 3,406,987 to Hunder et al. discloses a split-sleeve sheet metal pipe coupling useful in joining or repairing pipes comprising two stamped sheet metal casings which together form a cylinder and which have inclined flanges and pipe receiving guides for clamping the casings around a pipe. The casings include inwardly directed indentations for spacing the casings away from the pipe thereby forming a circumferential mold cavity adapted to receive a sealant between the pipe and the casing necessary to complete the repair.

U.S. Pat. No. 5,007,666 to Kyfes discloses a pipe fitting for encompassing a conduit comprising a pair of interlocking segments wherein each segment comprises an arcuate configuration having at least two longitudinal edges with one edge of each segment comprising a tongue split longitudinally in a direction substantially perpendicular to its length. The other of the edges comprising a groove conforming to and receiving the tongue formed on the juxtaposed edge of the other of the segments causing the tongue to engage with the groove thereby interlocking the segments of the pipe fitting together.

U.S. Pat. No. 5,443,096 to King discloses a pipe repair coupling comprising a pair of semi-circular separate and independent coupling segments. Each segment is identical in cross section, length and width. When coupled together along one elongated edge in a snap fit relationship, the interconnected segments may be placed about a cylindrical pipe to repair a hole therein and then squeezed together to lock along the other free elongated edges thereof.

U.S. Pat. No. 6,305,719 B1 to Smith et. al. discloses a pipe repair clamp for repairing a damaged pipe member wherein shell members are matingly engaged around the damaged pipe. Segmented inserts are received in a complementary annular channel formed in an inside face of the shell members to form a ring assembly supporting annular seals between the ring assembly and the damaged pipe member. A shell-sealing annular channel is formed between the ring assembly and the shell member to receive a liquid sealant necessary to complete the repair to form an annular seal between the ring assembly and the shell members.

While these devices fulfill their respective, particular objectives and requirements, the aforementioned patents do not disclose the present Electrical Conduit Installation System and Method of Use, which allows the relatively simple replacement of damaged conduit bodies of various configurations within a preexisting residential or commercial equipment installation. In the present invention the replacement process is accomplished using standard tools without the need for disconnection and withdrawal of wiring from such damaged conduit body that is typically required to remove a conventional conduit fitting.

SUMMARY OF THE INVENTION

Accordingly, the present invention is an Electrical Conduit Fitting Installation System and Method of Use for the installation/repair of electrical conduit in commercial/residential settings, which can be utilized for the replacement of preinstalled conduit fittings, which have been damaged. The present system and method of use comprises a plurality of electrical conduit fittings or so-called conduit bodies of various configurations, which are manufactured in generally symmetrical, half-sections and include complimentary hardware, gaskets and covers for a complete installation. The conduit bodies of the present system can be conveniently assembled and/or disassembled by use of fasteners such as machine screws and by the use of optional seals and adhesives, which interconnect the mating half-sections of each conduit fitting.

The method of use of such conduit bodies of the present system allows relatively simple replacement of a damaged conduit body of unitary construction using standard tools without the need for disconnection and withdrawal of wiring from the conduit required to remove a conventional conduit body.

The present system includes conduit body assemblies, conduit coupling assemblies and accessory conduit fittings, which are available in various configurations and trade sizes (i.e. ½ inch to 4 inch diameters) commonly used in the industry and are fabricated of materials such as engineered plastics, metals and explosion proof materials to achieve an industry approved installation.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other components, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiment and applications without departing from the spirit and scope of the present invention.

Prior to describing the novel features of the present invention in detail, it may be beneficial to briefly review the structure and installation of an electrical conduit fitting of the prior art in order that the description of the present invention that follows may be better understood and that the present contribution to the art may be better appreciated.

Figure 1:
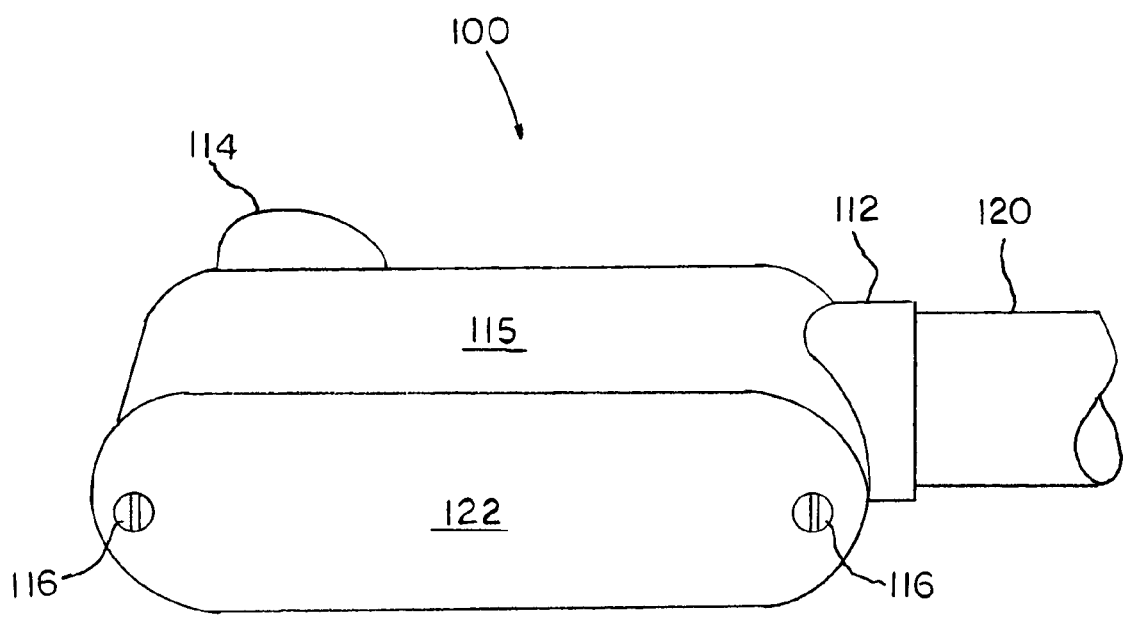
FIG. 1 is a perspective view of a prior art conduit body and is labeled Prior Art.

FIG. 1 illustrates a generally L-shaped conduit body assembly or so-called LB fitting of the prior art, indicated generally at 100. The prior art LB fitting 100 includes a body member 115 with an access plate 122 and further includes a wiring inlet 112 and a wiring outlet 114 formed therein, which are adapted to receive a length of electrical conduit 120 fabricated of approved materials such as engineered plastics and metals to achieve an industry approved installation for a given application. Conduit bodies are attached to conduit 120 when a change of direction is required and save installation costs by eliminating the bending of large conduits in order to change the direction of conduit runs.

Figure 2:
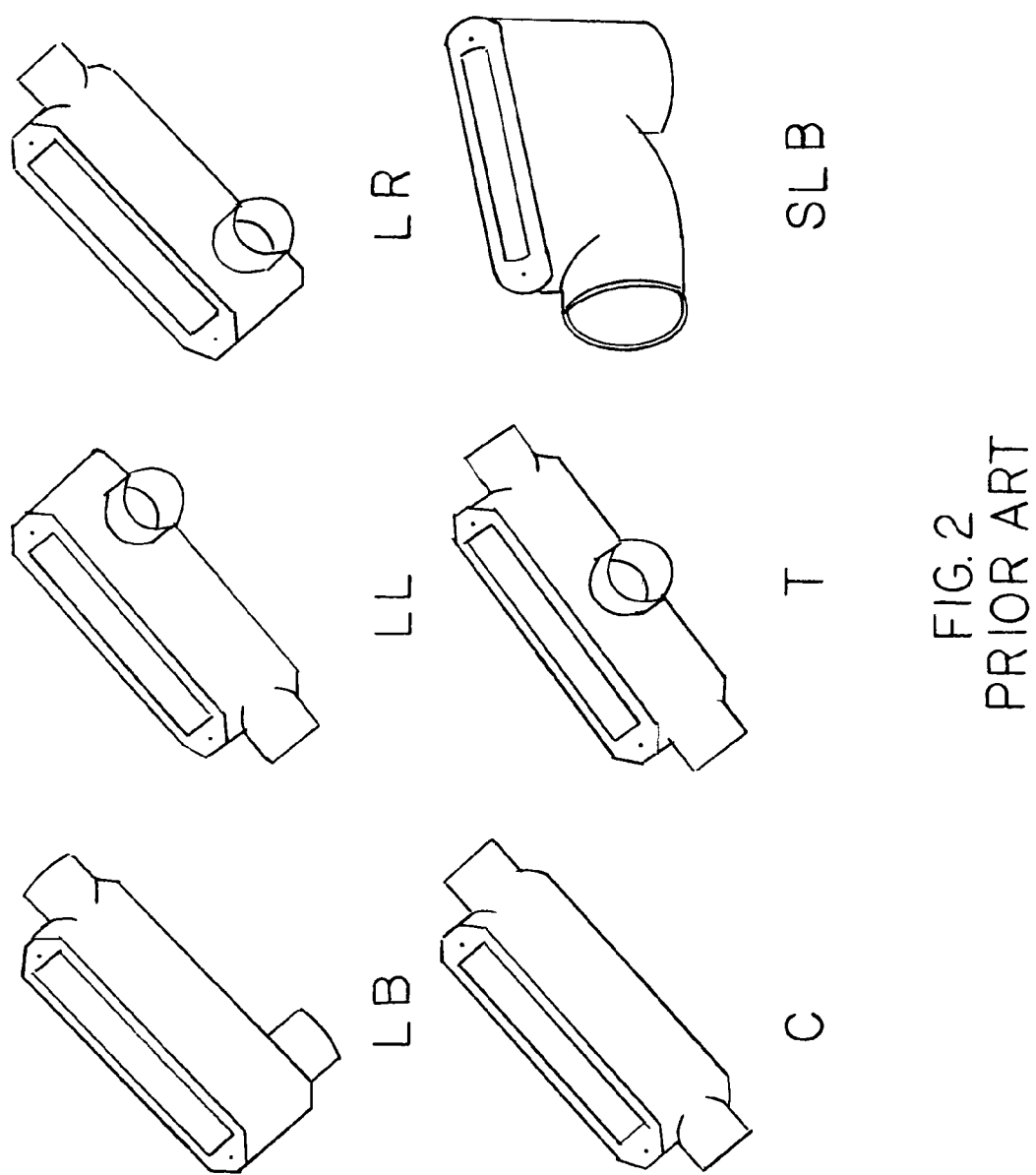
FIG. 2 is a composite perspective view of a plurality prior art conduit bodies for which the conduit bodies of the present system are utilized as replacements and is labeled Prior Art.

Referring to FIG. 2 industry nomenclature has been developed to describe various conduit bodies such as L-shaped bodies (so-called "Ells") including the LB, LL and LR, where the inlet 112 is in line with the access plate 122 and the outlet 114 is on the back, left or right respectively); T-shaped bodies (so-called "Tees") which feature an inlet in line with the access plate 122 and outlets 114 to both the access plate's left and right; C-shaped bodies (so-called "Cees") have identical openings above and below the access plate 122 and are used to pull conductors in straight runs as they make no turn between inlet and outlet; and "Service Ell" bodies (SLBs), shorter ells used where a circuit passes through an exterior wall from outside to inside of a structure.

Referring again to FIG. 1 body member 115 includes an access plate 122 attached by fasteners such as machine screws 116, which allow an installer to remove the plate and to grasp/pull wiring through the body member during an initial installation procedure or to perform repair operations. An access plate gasket (not shown) of suitable material is typically installed between body member 115 and plate 122 to prevent infiltration of moisture and/or chemical vapors.

It is not uncommon for electrical conduit 120 and/or such LB fittings 100 and other similar fittings (FIG. 2) installed on commercial/residential buildings to be damaged during building construction by vehicular impacts or other accidental contact requiring their replacement. Further, the exposure of such conduit 120 and fittings 100 to inclement weather causes corrosion and degradation necessitating periodic replacement to avoid an unsafe condition.

Figure 4:
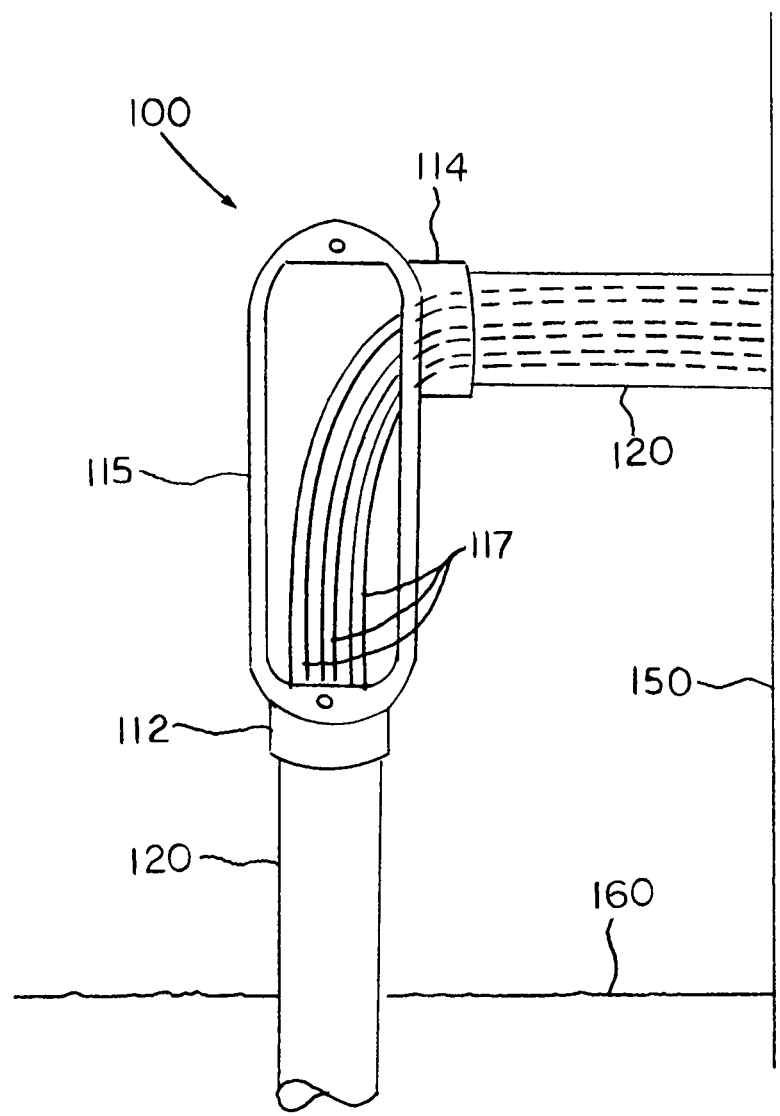
FIG. 4 is an elevation view of a prior art LL conduit body in an installed condition (shown with access plate removed) and is labeled Prior Art.

In the current industry practice of replacing such damaged prior art fittings 100, the electrical power must be turned off, the access plate 122 removed as shown in FIG. 4 and existing wiring 117 disconnected and withdrawn from the conduit 120 back to the location of the damaged fitting. Thereafter, the wiring 117 must be routed though another prior art conduit fitting 100 and reconnected often causing extensive disruption of service until the repair is complete. This results in substantial down time of the affected residential/commercial equipment and expensive labor costs to complete the repairs.

The present invention has been developed to resolve this problem and will now be described. The following description of the present system is provided to enable any person skilled in the art to make and use the invention, and is presented in the context of a particular replacement scenario and its requirements. It will be appreciated that various modifications to the disclosed embodiments will be readily apparent to those skilled in the art, and the general principles defined hereinbelow may be applied to replace any of the prior art conduit bodies shown in FIG. 2 and numerous other embodiments (not shown) without departing from the spirit and scope of the present invention.

Figure 3:
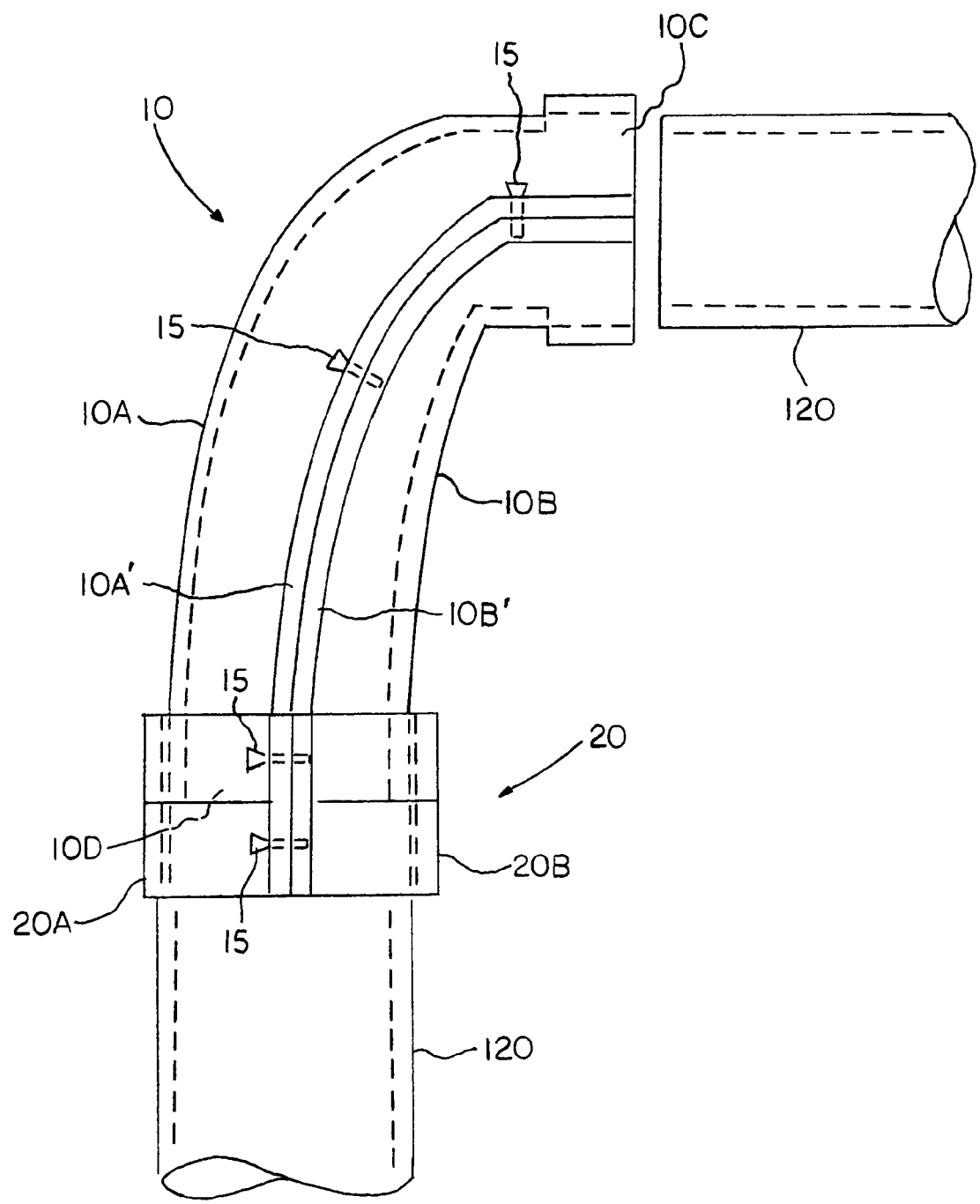
FIG. 3 is an elevation view of an embodiment of a replacement conduit body assembly (LB-R) of the present invention showing details thereof.
Figure 3A:
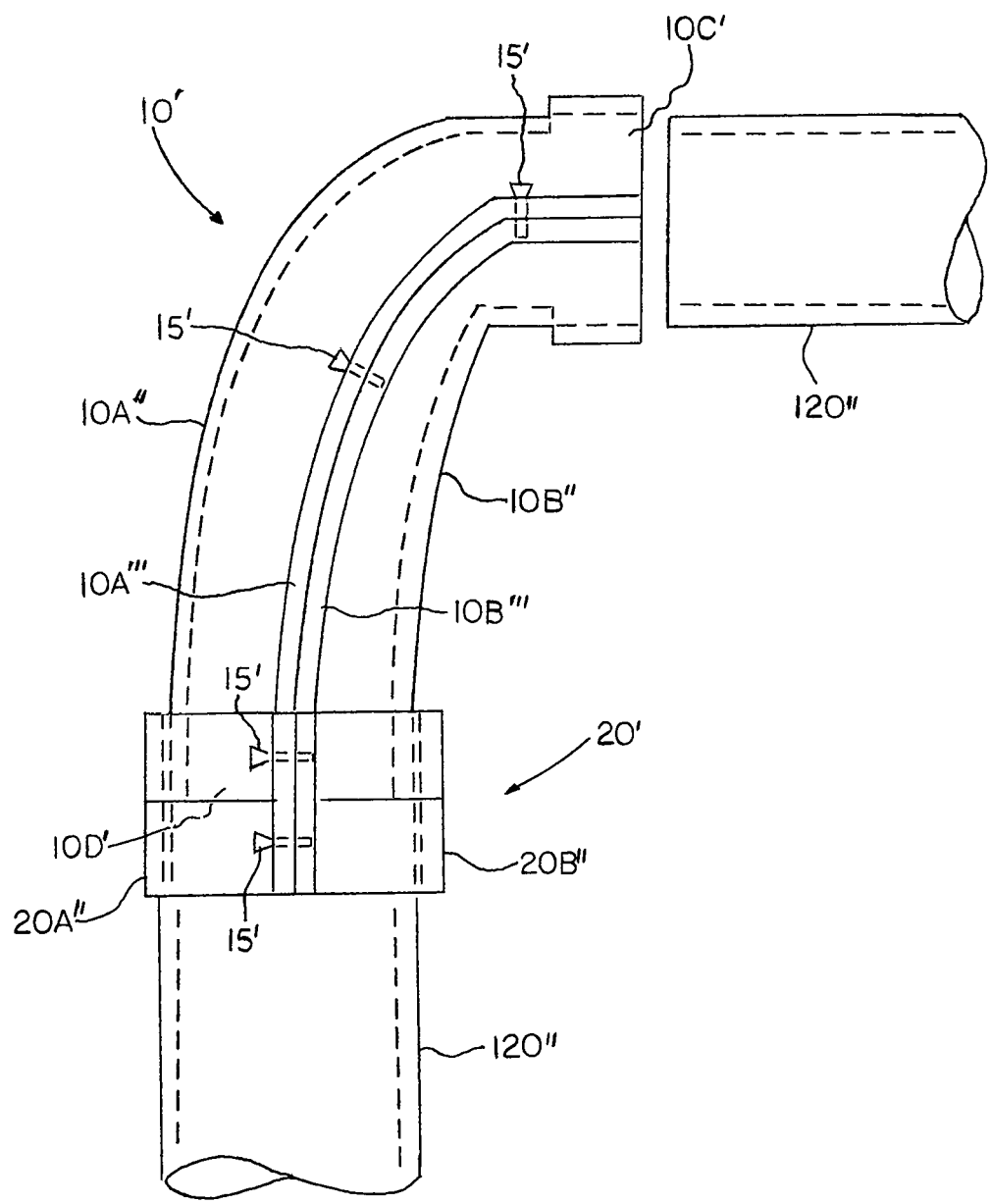
FIG. 3A is an elevation view of an alternative embodiment of a replacement conduit body assembly (LB-R) of the present invention showing details thereof.

With further reference to the drawings, FIGS. 3 and 3A illustrate embodiments of conduit body assemblies of the present system, indicated generally at 10, 10' respectively for the replacement of damaged conduit fittings 100 of the types shown in FIGS. 1 and 2. The present conduit body assemblies 10, 10' or LB-Replacement (hereinafter "LB-R" 10 or "LB-R" 10') are defined by a tubular body member comprising generally L-shaped half-sections 10A, 10B (FIG. 3) and 10A", 10B"(FIG. 3A) mechanically attached along a transverse center plane thereof. As shown each half-section 10A, 10B (FIG. 3) and 10A", 10B" (FIG. 3A) includes an integrally formed flange member 10A', 10B' (FIG. 3) and 10A''', 10B''' (FIG. 3A) respectively formed in generally perpendicular relation to each half-section, which is detachably secured by fasteners such as machine screws 15, 15". LB-Rs 10, 10' may also include additional hardware i.e. threaded inserts, washers and gaskets (not shown) advantageous for a given installation.

In accordance with the present system, it will be understood that LB-Rs 10, 10' are configured for common repair scenarios, that is, LB-R 10 LB-R 10' as illustrated in FIG. 3 and FIG. 3A respectively include a female end as at 10C, 10C' dimensioned to receive conduit 120, 120" of different sizes, for example, projecting from a building structure 150 (FIG. 4). As shown in FIGS. 3, 3A the opposite ends of LB-R 10, LB-R 10' include a male end as at 10D (FIG. 3), 10D' (FIG. 3A) dimensioned to be inserted into a mating female coupling, indicated generally at 20 (FIG. 3), 20' (FIG. 3A) respectively. In turn, couplings 20, 20' would each receive a section of conduit 120 of a different size emerging from the ground or concrete slab 160 (FIG. 4).

However, it will be understood by those skilled in the art that alternative embodiments of the LB-R 10 and LB-R 10' are included within the present system. For example, alternative versions of LB-R 10, LB-R 10' having two female ends 10C, 10C' (not shown) to receive conduit 120, 120'" and/or LB-R 10, LB-R 10' having two male ends 10D, 10D' (not shown) are contemplated in the present system. Thus, the embodiments disclosed in FIG. 3 and FIG. 3A are intended to be illustrative and not restrictive in any sense.

Figure 5:
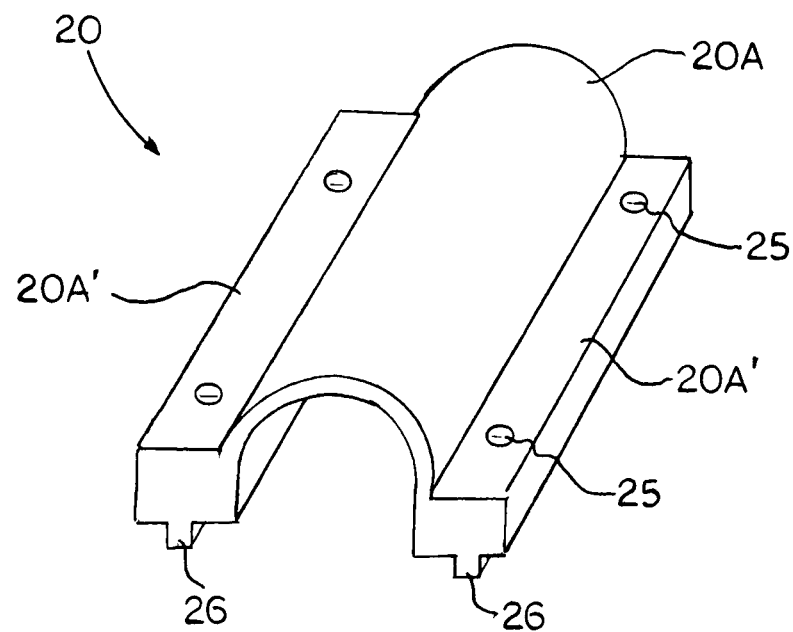
FIG. 5 is an expanded perspective view of a coupling component of the present invention.
Figure 5:
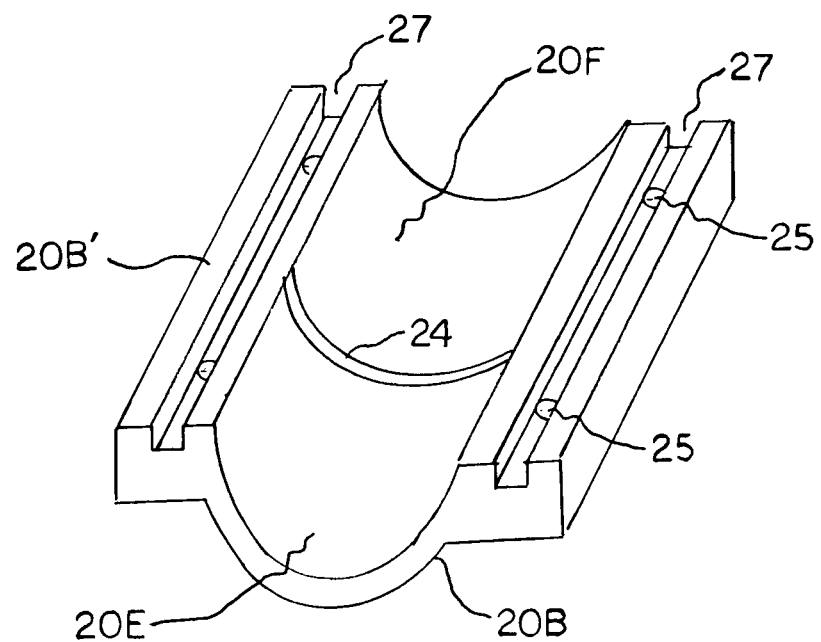
Figure 8:
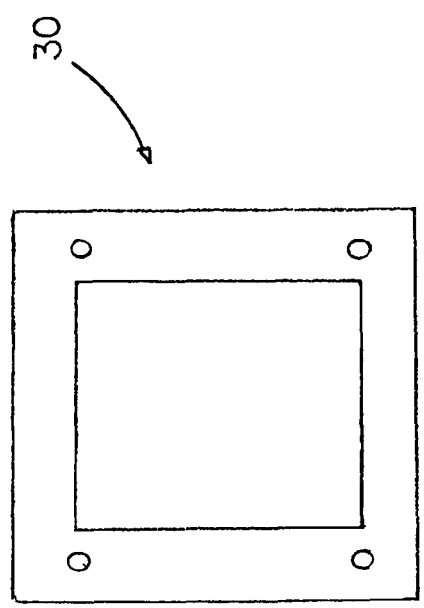
FIG. 8 is a plan view of an embodiment of a gasket for insertion between mating half-sections of a conduit coupling assembly.

Coupling assemblies 20 (FIGS. 3) and 20' (FIG. 3A) respectively each define a tubular body member comprising mating half-sections 20A, 20B (FIGS. 3) and 20A", 20B" (FIG. 3A) mechanically attached along a center plane thereof. As more clearly shown in FIG. 5, each half-section 20A, 20B of coupling assembly 20 includes a pair of integrally formed flange members 20A', 20B' respectively formed along a center plane of the coupling and projecting from each tubular half-section in generally perpendicular relation thereto. Half-sections 20A, 20B are detachably secured by fasteners such as machine screws 15 (FIG. 3) that engage mating threads formed in screw holes 25 (FIG. 5). Coupling assemblies 20, 20' may also include additional hardware i.e. threaded inserts, washers and a gasket, indicated generally at 30, as shown in FIG. 8 as necessary for a given installation.

It will be appreciated that coupling 20 as shown in FIG. 3 is configured for a specific repair scenario. Coupling 20 includes a first female end as at 20E dimensioned to receive conduit 120 having a predetermined outside diameter as more clearly shown in FIG. 5. An opposite end of coupling 20 includes a second female end as at 20F dimensioned to receive the male end 10D of LB-R 10 of the same diameter in mating engagement (FIG. 3). Coupling 20 may be provided with an integrally formed stop ring 24 as shown in FIG. 5 that limits the depth to which a male end 10D (FIG. 3) extends into the coupling 20.

Mating half-sections 20A, 20B of coupling 20 may also include a sealing means including, but not limited to the following structural elements. In the embodiment shown in FIG. 5, it can be seen each flange member 20A' of half-section 20A includes an elongated rectangular boss 26 which is adapted for mating engagement with a slot or groove 27 formed along the entire length of flanges 20B' of half-sections 20B as shown. The sealing means may include an optional gasket (not shown), which may be disposed within slot 27 and compressed by bosses 26 during assembly of the coupling 20 to ensure a proper seal.

Other configurations of the aforementioned bosses 26 and grooves 27 (not shown) are contemplated within the scope of the present invention. For example, bosses 26 and mating grooves 27 may be semicircular in cross-section and similarly function to join the mating half-sections 10A, 10B of conduit body 10 (FIG. 3) and coupling body 20 (FIG. 5) in mating engagement. Thus, the embodiments disclosed in FIG. 3, 5 are intended to be illustrative and not restrictive in any sense.

Figure 6:
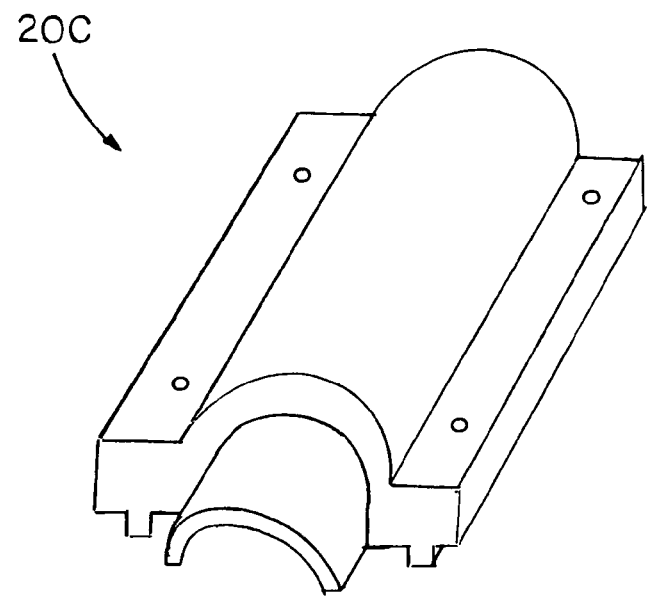
FIG. 6 is an expanded perspective view of an alternative embodiment of a coupling component of the present invention.
Figure 6:
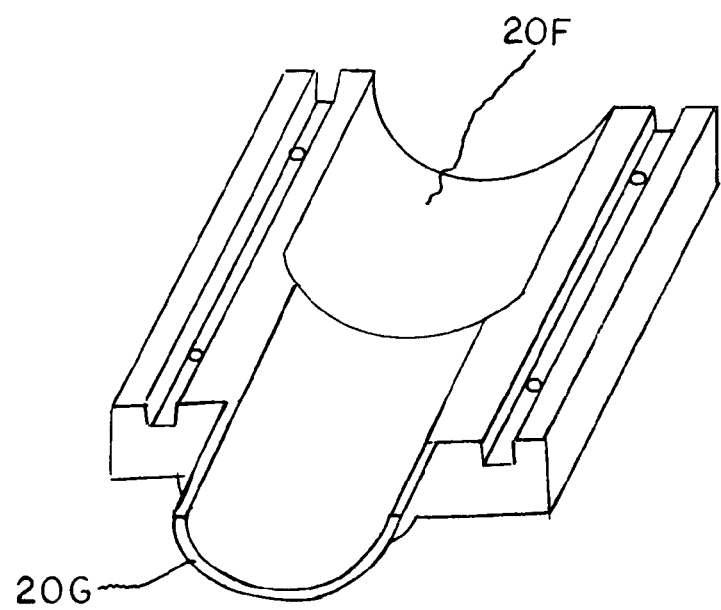

Accessory conduit fittings in accordance with the present system are provided as described below in various axial lengths and configurations to accommodate different repair scenarios and/or atypical installations. For example, a coupling 20C having a stepped diameter shown in FIG. 6 is provided to reconnect to conduit 120 broken off flush concrete slab 160 or with a solid wall of a building structure 150 wherein such coupling 20G must be fitted to the inside diameter of the damaged conduit. It will be appreciated that such coupling 20C is also configured for this specific repair scenario, that is, coupling 20C as shown in FIG. 6 includes a first female end as at 20F dimensioned to receive conduit 120 having a predetermined outside diameter. An opposite end of coupling 20 includes a male end having a stepped down outside diameter as at 20G dimensioned to be inserted within the preinstalled conduit 120 broken off flush with concrete slab 160. In all other respects coupling 20C functions in the manner described in relation to coupling 20 above.

Figure 7:
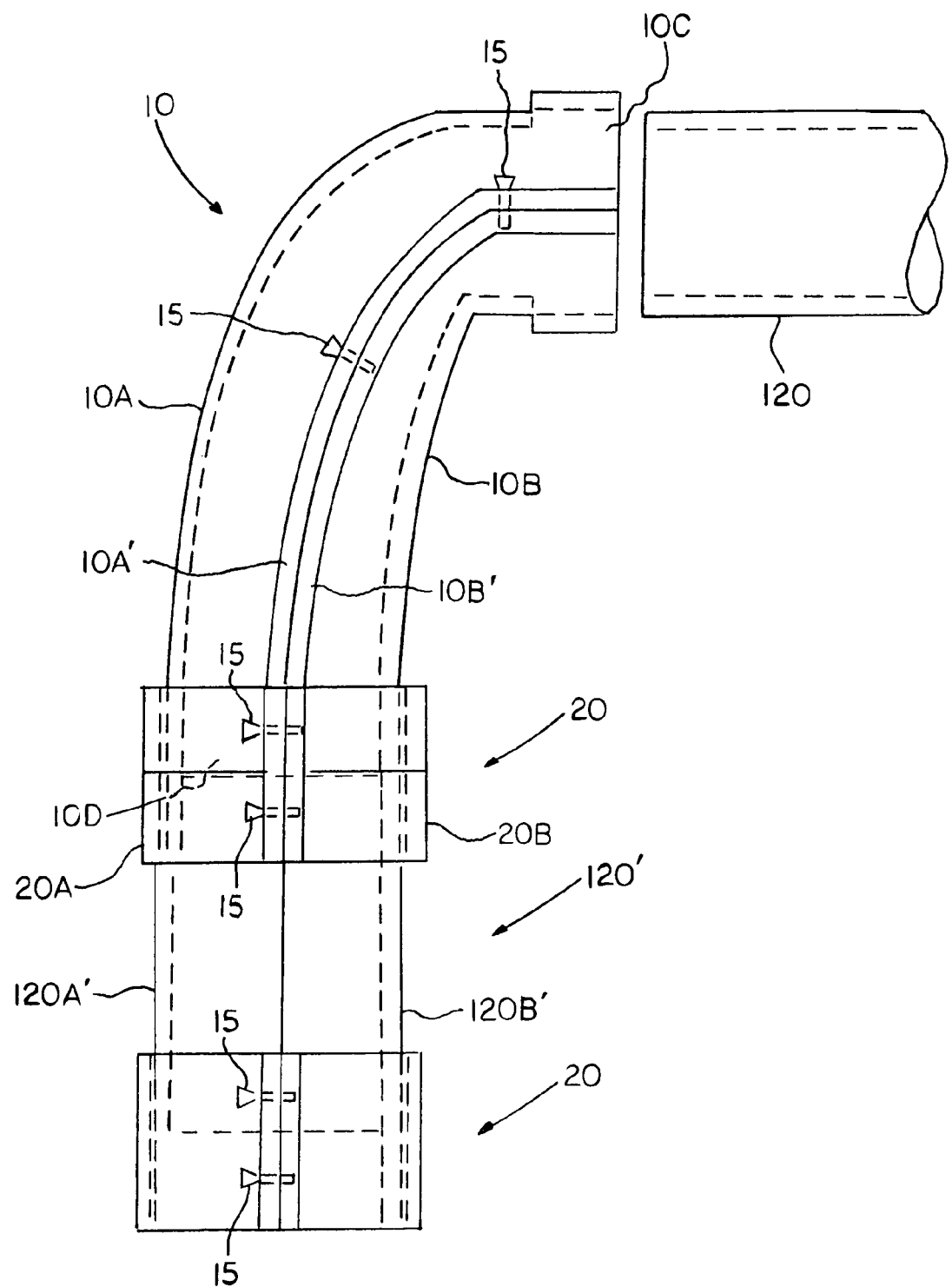
FIG. 7 is an elevation view of an alternative embodiment of a replacement conduit body assembly (LB-R) of the present invention including additional conduit accessory components.

In accordance with the present system, a pair of couplings 20 can be utilized in combination with a length of split conduit 120' (FIG. 7) that is divided into semi-cylindrical half-sections 120A', 120B'. Such split conduit 120' is inserted between the pair of couplings 20 to add vertical/horizontal length in a replacement installation wherein a conduit body 100 and a section of its attached conduit 120 have been damaged.

It will be appreciated by those skilled in the art that the present system includes a plurality of LB-Rs 10, 10' or other suitable LB-Rs and mating couplings such as couplings 20 (FIG. 3), 20' (FIG. 3A), 20C (FIG. 6) for replacement of the entire range of trade sizes (i.e. ½ inch to 4 inch diameters) commonly used in the industry including other L-shaped conduit bodies "Ells" (not shown); T-shaped conduit bodies "Tees" (not shown); C-shaped conduit bodies "Cees"; and Service Ells (SLBs) adapting the concepts of the present invention to alternative installations.

In a method of use of the present system, the conduit body 100 to be replaced is initially removed by cutting conduit 120 with a tubing cutter (not shown), a Dremel® tool (not shown) or other tool suitable for this purpose. Such cuts are made through conduit 120 at locations adjacent to wiring inlet 112 and wiring outlet 114 exercising caution not to damage the electrical wires 117 contained within conduit 120 (FIG. 4). Thereafter, access plate 122 is removed and body member 115 including wiring inlet 112 and a wiring outlet 114 are cut through using a rotary cutting tool such as a Dremel® tool along the length thereof such that the body member can be removed and only the intact wires 117 extending between sections of existing conduit 120 remain.

Next, an LB-R 10, LB-R 10' or other suitable LB-R and a coupling assembly 20, 20' or another suitable coupling assembly of the appropriate size, material and configuration are selected from the inventory of LB-Rs and couplings of the present system. It is reiterated that the present system includes a full range of such LB-Rs 10, LB-Rs 10' or other LB-Rs and coupling assemblies 20, 20' which correspond to various industry sizes (i.e. ½ inch to 4 inch diameters) and configurations commonly used in the trade.

Next, the selected LB-R 10, LB-R 10' and a matching coupling assembly 20, 20' are disassembled into mating half-sections by removal of machine screws 15, 15'. Thereafter, the half-sections 10A, 10B of the LB-R 10 (FIG. 3) or 10A", 10B" of LB-R 10' (FIG. 3A) and matching half-sections 20A, 20B of coupling assembly 20, (FIG. 3) or matching half-sections 20A", 20B" (FIG. 3A) of coupling assembly 20' are arranged such that the existing wiring 117 and both sections of conduit 120 or conduit 120" are disposed within the respective LB-R and coupling assembly to be utilized in the repair.

Next, screws 15, 15' are advanced into threaded holes 25 and tightened to secure the LB-R 10 or LB-R 10' and a mating coupling assembly 20, 20' and/or any needed accessory components such as split conduit 120' in position to complete the repair.

Although not specifically illustrated in the drawings, it should be understood that additional equipment and structural components will be provided as necessary and that all of the components described above are arranged and supported in an appropriate fashion to form a complete and operative Electrical Conduit Fitting Installation System and Method of Use incorporating features of the present invention.

Accordingly, it is appropriate that the appended claims be construed broadly and in a manner consistent with the scope of invention.

What is claimed is:

1. An electrical conduit fitting installation system comprising:
    a plurality of conduit body assemblies, wherein each conduit body assembly is comprised of a tubular body member divided into a first mating half-section and a second mating half-section, wherein each mating half-section of each conduit body assembly includes a pair of flange members including a first and a second flange member integrally formed along a center plane thereof, each of said flange members projecting from each tubular half-section of said conduit body assembly in generally perpendicular relation thereto, wherein the mating half-sections of each conduit body assembly are mechanically attached by suitable fasteners; and
    a plurality of conduit coupling assemblies for mating engagement with said conduit body assemblies, wherein each of said conduit coupling assemblies is comprised of a tubular body member divided into a first mating half-section and a second mating half-section, said tubular body member having an internal stop ring formed therein, wherein each mating half-section of each conduit coupling assembly includes a pair of flange members including a first and a second flange member integrally formed along a center plane thereof, wherein each of said first flange members of said conduit coupling assemblies includes an elongated boss integrally formed therein extending the entire length thereof, wherein each of said second flange members of said conduit coupling assemblies includes an elongated groove integrally formed therein extending the entire length thereof, wherein each of said elongated grooves formed on said second flange members are adapted for mating engagement with said bosses formed on said first flange members when the mating half-sections of each conduit body assembly are juxtaposed during assembly, wherein the first and second mating half-sections of each conduit coupling assembly include a gasket disposed therebetween, wherein the mating half-sections of each conduit coupling assembly are mechanically attached by suitable fasteners.

2. The electrical conduit fitting installation system of claim 1 wherein each of said grooves and said bosses is rectangular in cross-section.

3. The electrical conduit fitting installation system of claim 1 wherein said mating half-sections of said conduit bodies are secured by machine screws installed through said flange members during assembly thereof.

4. The electrical conduit fitting installation system of claim 1 wherein said mating half-sections of said conduit coupling assemblies are secured by machine screws installed through said flange members during assembly thereof.

5. A method of replacing an electrical conduit body interconnected to preinstalled electrical conduit without disconnecting the preinstalled electrical wiring captured therein, the method comprising the steps of:
    removing a conduit body to be replaced from a length of preinstalled electrical conduit;
    exposing the preinstalled wiring through a gap formed in the conduit by removal of the conduit body;
    selecting a replacement conduit body assembly and a mating conduit coupling assembly wherein each is constructed in detachable tubular half-sections, wherein each tubular half-section of each conduit body assembly includes a pair of flange members including a first and a second flange member integrally formed along a center plane thereof, each of said flange members projecting from each tubular half-section of said conduit body assembly in generally perpendicular relation thereto, wherein each tubular half-section of each conduit coupling assembly includes an internal sto rin formed therein wherein each matin half-section of each conduit coupling assembly includes a pair of flange members including a first and a second flange member integrally formed along a center plane thereof, wherein each of said first flange members of said conduit coupling assemblies includes an elongated boss integrally formed therein extending the entire length thereof, wherein each of said second flange members of said conduit coupling assembly includes an elongated groove integrally formed therein extending the entire length thereof, wherein each of said elongated grooves formed on said second flange members are adapted for mating engagement with said bosses formed on said first flange members when the mating half-sections of each conduit body assembly are juxtaposed during assembly, wherein the first and second mating half-sections of each conduit coupling assembly includes a gasket disposed therebetween;

disassembling the replacement conduit body assembly and the selected conduit coupling assembly into said detachable half-sections;

arranging the detachable half-sections of said replacement conduit body assembly and said mating conduit coupling assembly to enclose the exposed wiring thereby covering said gap formed in the electrical conduit;

aligning the detachable half-sections of said replacement conduit body assembly and the mating conduit coupling assembly about the gap formed in the conduit, reassembling the detachable half-sections of the conduit body assembly and the conduit coupling assembly to capture said preinstalled electrical conduit and said electrical wiring contained therein; and installing fasteners in the detachable half-sections of said replacement conduit body assembly and said mating conduit coupling assembly to secure said detachable half-sections in position thereby covering said gap formed in the conduit.

6. The method of claim 5 wherein the step of removing is carried out by a rotary cutting tool.

7. The method of claim 5 wherein the step of selecting further includes the step of measuring the conduit body assembly and the mating conduit coupling assembly to fit the preinstalled electrical conduit.

\* \* \* \* \*